March 29, 1960  P. DOPP ET AL  2,930,379
DEVICE FOR PRODUCING COAGULATIONS, PARTICULARLY
IN THE FUNDUS OF THE HUMAN EYE
Filed April 2, 1958  6 Sheets-Sheet 6

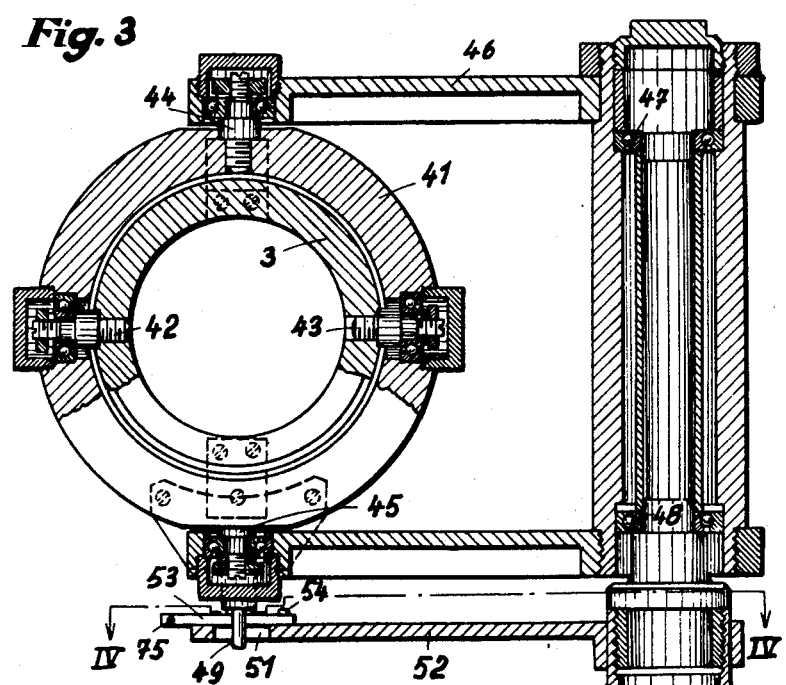
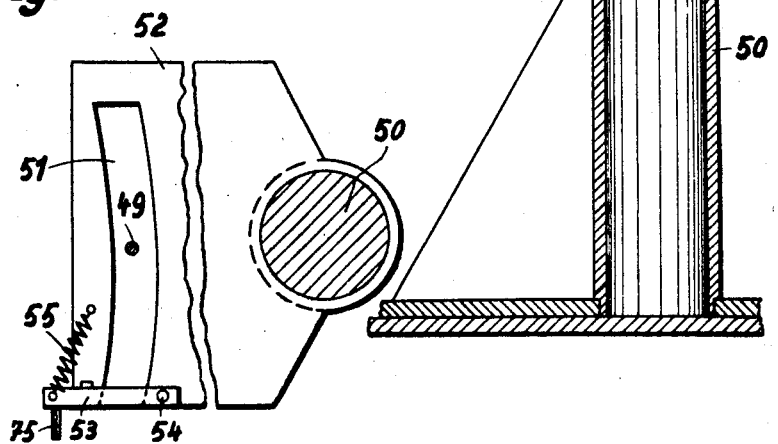

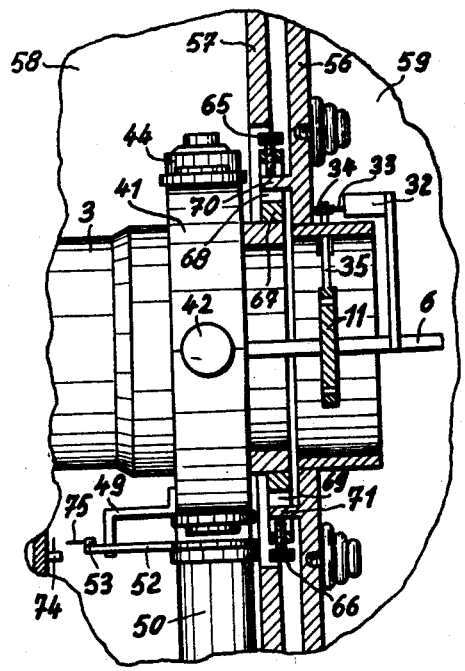
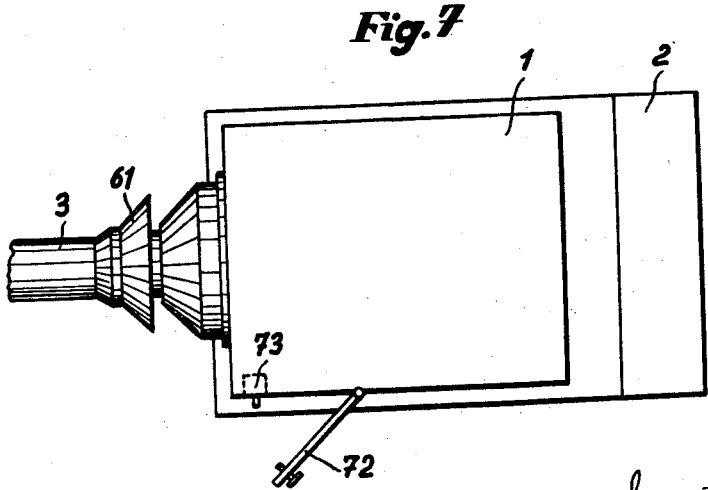

United States Patent Office 2,930,379
Patented Mar. 29, 1960

2,930,379

DEVICE FOR PRODUCING COAGULATIONS, PARTICULARLY IN THE FUNDUS OF THE HUMAN EYE

Paul Dopp, Aalen, and Hans Littmann, Heidenheim, Germany, assignors to Carl Zeiss, Heidenheim, Wurttemberg, Germany Application April 2, 1958, Serial No. 725,929

Claims priority, application Germany April 9, 1957

13 Claims. (Cl. 128—396)

The invention relates to a device for producing coagulations, particularly in the fundus of the human eye.

In abductions of the retina of the eye, for instance in detached retinas, it has been proposed heretofore to treat the eye in such a manner that a "fusion" is produced between the retina and the choroid membrane of the eye, so that the retina at the mentioned area is coagulated by the action of light radiation. For this purpose a source of light having a high radiation intensity is employed and projected onto the fundus of the eye. The result is that a very powerful absorption of the radiation energy is obtained principally in the pigmentepithel and in the choroid membrane and this radiation energy to a great extent is converted into heat. The heat which is produced in the tissue at the area where the light rays are concentrated is carried away into the surrounding area by conduction and convection. In particular, the choroid membrane in view of its richness in vascularity possesses a good heat conducting property. If, however, the heat supply is greater than the heat dispersion per unit of time, then the irradiated tissue increases continually in its temperature and finally this leads to a decrease of the albumin in the tissue and the result is a coagulation. During the following period of one to two weeks the coagulation base becomes flat and finally is converted into a scar within which the retina and the choroid membrane have a common membrane penetrated with pigment.

A known device for practicing this treatment method contains a source of light having a high radiation intensity, a condenser for projecting an image of the source of light into a diaphragm, a lens for producing a parallel path of the light rays in rear of this diaphragm, and also a mirror which is arranged in the direction of the light rays behind this lens, and this mirror deflects or directs the light rays into the eye of the patient. The eye lens unites the parallel light rays on the fundus and, therefore, at this point a coagulation may be produced when the radiation intensity is sufficient. In order to practice this method under constant observation by the physician, the mentioned mirror is provided with a central aperture through which the physician is able to observe the eye of the patient.

In this known device the mentioned optical elements are all arranged within a common casing which may be moved from place to place and for this purpose is provided with traction wheels. This known device, however, has the disadvantage that it is difficult to move and an adjustment of the beam of light onto the area of the retina to be treated is extremely difficult and time consuming.

It is an object of the present invention to overcome this disadvantage of the known device by arranging all optical elements, including the source of light and the diaphragms upon a common carrier which is so suspended in a housing that the carrier in its point of gravity is freely rotatable in a vertical direction and in a horizontal direction and also is movable in its longitudinal direction.

By employing a carrier suspended in such a manner the assurance is given that the carrier with its optical elements can readily be rotated about a vertical axis and a horizontal axis and may also be displaced in longitudinal direction without any unfavorable or unbalanced weight distribution which would make the adjustment difficult. This means, that when the bearings supporting the carrier are suitably made that the carrier may be moved and adjusted very easily and very accurately and the treating physician is able to adjust the device without effort to the desired position.

It is also an object of the invention to arrange all of the mentioned optical elements in a tubular member which in the neighborhood of its point of gravity is surrounded by an additional coaxial tubular member or a sleeve. The first tubular member is rotatably mounted about a horizontal axis in this additional tubular member which itself is rotatably mounted about a vertical axis in a fork. The fork in turn is rotatably adjustable about a vertical axis which is positioned parallel to the axis of the first mentioned vertical axis.

With these and other objects in view the invention will now be described in connection with a preferred embomiment of the device.

Fig. 3 is a vertical sectional view of the suspension of the tubular member which carires the optical elements, taken substantially along the line III—III in Fig. 1.

Fig. 4 is a horizontal section taken substantially along the line IV—IV in Fig. 3.

Fig. 6 is a vertical section with parts broken away, taken along the line VI—VI in Fig. 5.

Fig. 7 is a plan view of the device shown in Fig. 1 with parts broken away.

Figure 1:
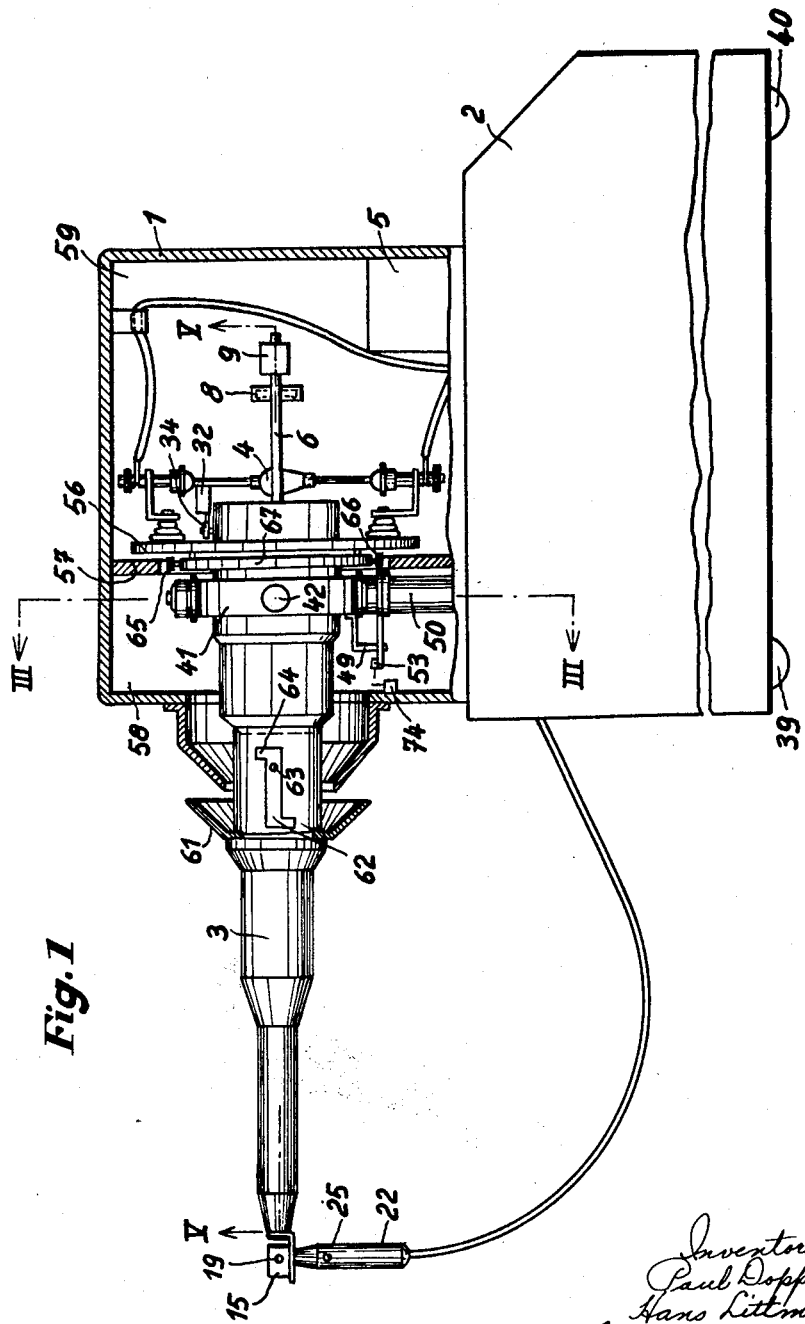
Fig. 1 is a side elevation view of the device of the invention, partly in longitudinal section, Fig. 2 illustrated diagrammatically the arrangement of the optical elements of the device.

Referring to Fig. 1, a casing 1 is mounted on top of a bottom casing 2 which latter contains the equipment to supply the device with the necessary electric current for its operation. Casing 1 has movably mounted therein a substantially horizontally arranged tube 3 which contains the optical elements of the device. This tube 3 has also attached thereto a source of light, namely a lamp 4, which receives the necessary electric energy for operation from the equipment arranged in the bottom casing 2. The lamp 4 is connected with an ignition device 5 which is arranged separate from the tube 3 in the housing 1. The lamp 4 may be provided with two arc-electrodes arranged in a tube filled with gas under high pressure. The tube 3 has also connected thereto two holders 6 and 7 which carry a concave mirror 8 and an adjustable counterweight 9.

Figure 2:
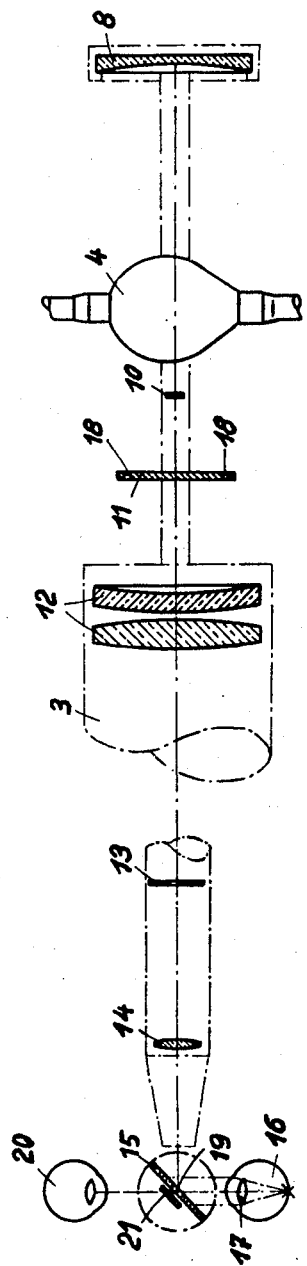
Figure 5:
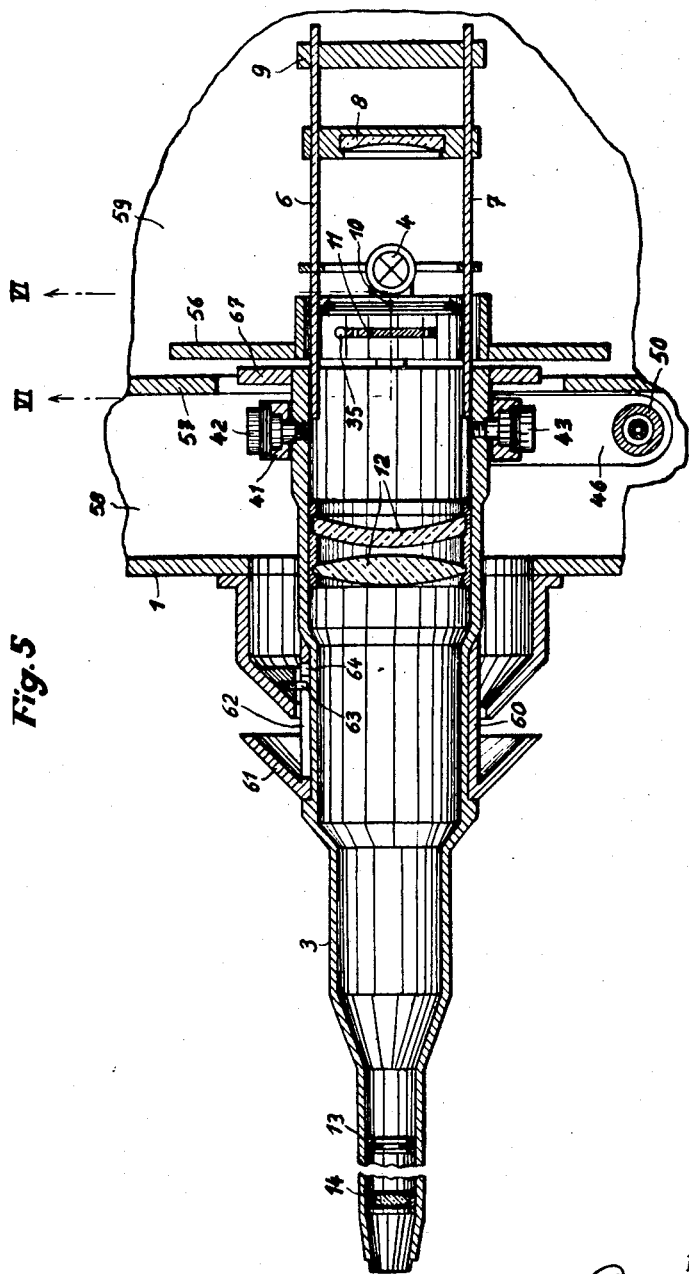
Fig. 5 is a longitudinal section of the tubular member 3 with parts broken away, taken substantially along the line V—V in Fig. 1.

Fig. 2 illustrates diagrammatically the arrangement of the optical elements of the device. In front of the lamp 4 is mounted a point-shaped diaphragm 10 and in front of the latter a screen diaphragm 11. The light emitted by the lamp 4 is projected by means of a condenser 12 into the plane of the diaphragm 13. Preferably, the diaphragm 13 is constructed in such a manner that its aperture may be varied. The intermediate image of the lamp appearing in the plane of the diaphragm 13 is projected by means of a lens 14 into infinity. The beam of light having parallel light rays and emitted by the lens 14 is reflected by a mirror 15 into the eye 16 of a patient. The eye lens 17 focuses the light entering it upon the retina of the eye. At this point or area coagulations may be produced when the entire light emitted by the lamp 4 reaches the eye 16 of the patient. For this purpose, it is necessary to pivotally move the screen diaphragm 11 out of the path of the light beam during the actual treatment of the eye. The screen diaphragm 11 has the only purpose to weaken the light during the period the retina is scanned in order to adjust the device to the area to be treated so that the other portions of the eye cannot be injured. The screen diaphragm 11 consists of a circular plate having in its peripherial area a circular series of apertures 18. These apertures are projected with the exit pupil of the device in the pupil of the eye 16 which is irradiated and are, therefore, visible as individual luminous light bundles. In this manner a correct centering of the beam of light into the pupil of the patient's eye is facilitated. In order to make an observation of the eye 16 of the patent possible, the mirror 15 is provided with a central aperture 19. The eye 20 of the physician who treats the patient looks through this aperture 19 during the entire treatment of the eye 16 of the patient.

In order to avoid halation at the edge of the central aperture 19 of mirror 15, the point-shaped diaphragm 10 is provided. This diaphragm is so designed that a small annular zone around the central aperture 19 remains unilluminated.

Figure 8:
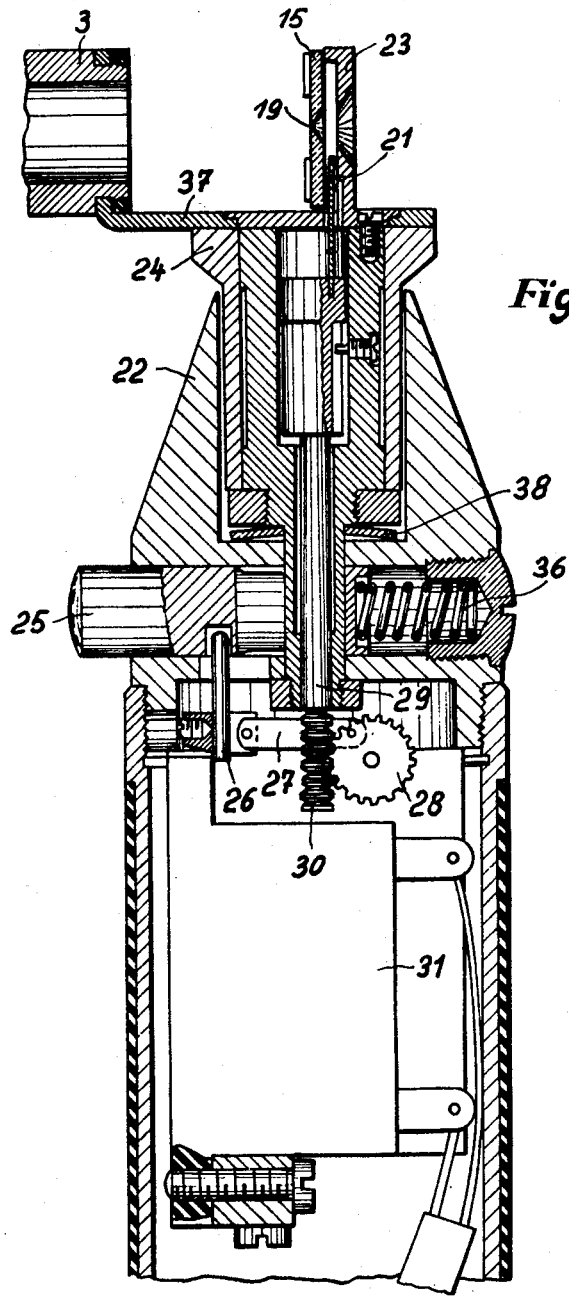
Fig. 8 is a vertical sectional view of the handle 22 shown in Fig. 1.

Figs. 1 and 8 show that the mirror 15 is attached to the outermost end of the tube 3 which projects from the casing 1. The mirror 15 is provided with a handle 22 a sectional view of which is shown in Fig. 8.

It can be seen from Fig. 8 that the mirror 15 with its central aperture 19 is arranged on a mirror holder 23. This mirror holder is firmly screwed to part 24 of handle 22. Handle 22 is equipped with a push button 25 which when pressed turns a gearwheel 28 via a lever 26 and a rod 27. The gearwheel 28 engages in the grooves 30 of a shaft 29. Shaft 29 in turn is firmly connected with a grey filter 21. When pressing the push button 25, the shaft 29 is pushed upwards. Thereby, the grey filter 21 is inserted between mirror 15 and mirror holder 23. Simultaneously, when pressing push button 25, a switch 31 is closed which actuates an electromagnet 32 which serves for swinging the screen diaphragm 11 out of the illuminating path of rays.

As will be gathered from Fig. 6 especially, this electromagnet 32 is arranged on the holders 6 and 7 and bears a rack 33. In this rack 33 engages a gearwheel 34 which is arranged on an axis 35. The screen diaphragm 11 is swingable about this axis 35. When pressing push button 23, the screen diaphragm 11 is thus swung about the axis 35 so that all the light of the light source 4 can fall into the eye 16 of the patient.

Fig. 8 further shows that a spring 36 is provided which serves to return the push button 25 to its original position and thus to open switch 31, return of the grey filter 21 and simultaneous folding of the screen diaphragm 11 into the path of rays.

Handle 22 is rotary in a ring 37. Thus is it possible to rotate the mirror 15 about the axis of the handle 22. Ring 37 in turn is rotary on tube 3. In this manner it is possible to swing the mirror 15 together with its handle 22 about the axis of tube 3. If the physician who treats the patient has found the optimum position of the mirror 15 by swinging it, it can happen that the push button 25 is in a range not easily reached by the physician. This can be prevented by holding part 24 fast and turning handle 22 against part 24. Such turning is made possible by arrangement of a spring 28 between the parts 24 and 22.

The device is adjusted first by pushing the entire device close to the bed of the patient by means of the pairs of wheels 39 and 40. In order to precision-adjust the instrument it is necessary to displace the tube 3. For that purpose it may be necessary to move the tube 3 in longitudinal direction and to adjust it about a horizontal and a vertical axis at the same time. In order to make this possible, a bearing for tube 3 is provided as shown especially in Fig. 3.

Referring to Fig. 3, it will be noted that the tube 3 in the neighborhood of its point of gravity, which point of gravity may be changed by a slidable adjustment of the counterweight 9 in axial direction of the tube 3, is surrounded by a sleeve 41. The tube 3 is provided on two diametrically opposed points with horizontal stub shafts 42 and 43 which enter into the wall of a sleeve 41 which surrounds the tube with clearance so that the tube 3 is adjustable about a horizontal axis extending at right angle to the longitudinal axis of the tube 3. The clearance or annular space between the inner diameter of the sleeve 41 and the outer diameter of the tube 3 and the length of the sleeve 41 is determined in such a manner that the tube 3 is pivotally adjustable about a predetermined angle about the horizontal axis of the stub shafts 42 and 43.

The sleeve 41 is suspended in a fork 46 by vertically aligned stub shafts 44 and 45 which permit a rotatable adjustment of the sleeve about a vertical axis. The fork 46 in turn is attached by means of vertically spaced bearings 47 and 48 to a vertical column 50 so that the fork 46 is rotatable about the center axis of the column 50.

In view of this suspension it is possible to rotatably adjust the tube 3 in a vertical direction and in a horizontal direction and also to slidably adjust the tube 3 in its longitudinal direction. In order to limit the adjustment of the tube 3 in horizontal direction and also in its lengthwise direction the sleeve 41 is provided with a downwardly projecting pin 49 which extends into a cam slot 51 of a horizontal plate 52 which is rigidly secured to the column 50. The shape of the lateral limit of the cam slot is so selected that during the sliding movement of the pin 49 along the slot edge, a movement of the tube 3 in a correct axial direction takes place. The front limit of the cam slot is formed by a bar 53 one end of which is rotatable about an axis 54. This bar 53 is maintained by a spring 55 in its rest position shown in Fig. 4. The tension of the spring 55 is so selected that normally when the pin 49 engages the bar 53, no pivot movement of the bar takes place.

Before working with the device it is necessary to adjust the lamp 4. Since as already mentioned the lamp 4 contains a gas filling under high pressure one must take into consideration that the lamp may explode and shatter. It is, therefore, necessary to provide for the adjustment of the lamp a space into which no splinters or chips of the lamp can enter. For this purpose a ring 56 is mounted on the tube 3. This ring 56, in the extreme forward position of the tube 3, engages a partition wall 57 in the casing 1 and thereby a separate splinterproof front portion 58 is established in the casing 1 which is separated from the rear portion 59 which contains the lamp 4. A tube 60 arranged coaxially around the tube 3 is used for arresting or locking the tube 3 in its extreme forward position. The tube 60 is provided with a conical splinter shield 61 and is freely rotatable mounted on the tube 3. The tube 60 is provided with a groove 62 into which extends a pin 63 fixedly attached to the casing 1. By applying some force the tube 3 is pulled into its extreme forward position and when then the tube 60 is rotated the pin 63 will enter the offset portion 64 of the groove 62. In this manner the tube 3 is locked in its extreme forward position. At the same time the ring 56 engages thte partition wall 57 and a splinterproof separation is established between the casing portions 58 and 59. It is now possible to adjust the lamp 4 by rotating the adjustment screws 65 and 66 which are arranged in a ring 67 fixedly mounted on the tube 3. This ring 67 contains two radial slots 68 and 69 in which two projections 70 and 71 connected to the ring 56 engage. The adjustment screws 65 and 66 are accessible when entering the forward portion 58 of the casing 1 after the tube 3 has been pulled into its extreme forward position.

In order to prevent an adjustment of the device when the tube 3 is not locked in its forward position there are provided two electric switches. The same are arranged in a manner that the lamp 4 is only then supplied with current and lights up when at least one of these switches is closed.

The front portion 58 of the casing is accessible by means of a door 72. In the casing 1 is arranged an electric switch 73 in such a manner that when the door 72 is opened the switch 73 is open. The second electric switch 74 is only closed when the tube 3 is locked in its foremost position. In such a case the bar 53 is pivotally moved against the action of the spring 55 and a pin 75 on this bar 53 presses upon the switch 74 and closes it.

When the door 72 permitting access to the front portion 58 of the casing 1 is opened and if the tube 3 is not locked in its foremost position then both electric switches are open and the lamp 4 is no longer supplied with current and is dark. If, however, the tube 3 is locked in its foremost position the switch 74 is closed and the lamp remains lit, even after the door to the casing portion 58 is opened which also opens the switch 73. Now the lamp 4 can be adjusted.

In order to treat a patient, first the entire device is moved to the bed of the patient. For this purpose the base casing 2 is provided with pairs of traction wheels 39 and 40. Then the tube 3 is adjusted as required in vertical direction and in horizontal direction and in lengthwise direction and all these adjustments take place while the screen diaghragm 11 is arranged within the beam of light coming from the lamp 4. After the adjustment to the eye 16 of the patient is completed, the mirror 15 is used for scanning the retina of the eye 16 to determine the correct location where a coagulation is to be produced. Then a pressure upon the push button 25 on the handle 22 causes the screen diaphragm 11 to move pivotally away from the beam of light and then the coagulation takes place. When pressing the push button 25 also the grey filter 21 is automatically moved in front of the center aperture 19 of the mirror 15 so that the physician can observe the eye 16 without becoming blinded.

What we claim is:

1. In a device for producing coagulations, particularly in the fundus of the human eye, a casing, a common carrier having arranged thereon in axially spaced relation a source of light, a condenser for projecting an image of said source of light into a predetermined plane, a diaphragm in said predetermined plane, a lens spaced in front of said diaphragm for producing a beam of parallel light rays and a reflector for reflecting said beam of parallel light rays into the eye to be treated, a screen diaphragm between said source of light and said condenser for weakening the light rays passing from said source of light to said condenser, means for moving said screen diaphragm away from said light rays so that the latter reach said condenser unweakened, means for supporting said common carrier in its point of gravity in said casing in such a manner that said carrier is rotatably adjustable about said point of gravity about a vertical axis and a horizontal axis, and means for adjusting said carrier lengthwise of the axis along which said source of light, condenser, diaphragm and lens are arranged.

2. In a device for producing coagulations, particularly in the fundus of the human eye, a casing, a substantially horizontally arranged tube having mounted at one end thereof a lamp, said tube having mounted therein in axially spaced relation a condenser, a diaphragm and a lens for producing a beam of parallel light rays from the light coming from said lamp, and a mirror at the other end of said tube for reflecting said beam of parallel light rays into the eye to be treated, said mirror being provided with a center aperture through which said eye may be observed, a sleeve concentrically surrounding said tube with annular clearance in the vicinity of the point of gravity of said tube and the parts carried by the same, means for rotatably supporting said tube in said sleeve about a horizontal axis which extends at right angles to the longitudinal axis of said tube, means for supporting said sleeve to permit its adjustment about a vertical axis which goes through the longitudinal axis of said tube, said supporting means including a fork, a vertical column arranged besides said tube, means for rotatably supporting said fork on said column so that said fork is rotatable about the vertical axis of said column, said column and fork being arranged in said casing with the forward end of said tube having said reflector thereon projecting from said casing, while the rearward end of said tube with the lamp thereon is arranged within said casing.

3. A device as claimed in claim 2, including a pin extending downwardly from said sleeve, and a horizontal plate having a cam slot therein fixedly attached to said vertical column, said pin extending into said cam slot which limits the adjustment of said tube in horizontal and lengthwise direction.

4. A device as claimed in claim 2, including a pin extending downwardly from said sleeve, and a horizontal plate having a cam slot therein fixedly attached to said vertical column, said pin extending into said cam slot which limits the adjustment of said tube in horizontal and lengthwise direction, the front end of said cam slot in said plate being formed by a pivotally mounted bar, and a spring for normally holding said bar in a predetermined rest position.

5. A device as claimed in claim 2, including a pin extending downwardly from said sleeve, and a horizontal plate having a cam slot therein fixedly attached to said vertical column, said pin extending into said cam slot which limits the adjustment of said tube in horizontal and lengthwise direction, the front end of said cam slot in said plate being formed by a pivotally mounted bar, a spring for normally holding said bar in a predetermined rest position, a normally open electric switch mounted in said casing and arranged in the circuit of said lamp, said pivotally mounted bar being adapted to be moved against the action of said spring by said pin on said sleeve upon axial adjustment of said tube to its foremost position and thereby closes said switch, and a second electric switch arranged in the circuit of said lamp in such a manner that said lamp will be energized when at least one of said two switches is closed.

6. A device as claimed in claim 2, including a tubular member rotatably mounted on said tube and secured thereon against axial movement, said tubular member being provided with a guide groove, and a pin secured to said housing and extending into said guide groove, the latter having such a shape that upon rotation of said tubular member after axial forward movement of said tube, the latter is locked in its foremost position.

7. A device as claimed in claim 2, including an annular ring member attached to the rear portion of said tube, and a partition within said casing arranged forwardly of said annular ring member on said tube, said annular ring member being adapted to engage said partition when said tube has been axially adjusted to its foremost position, whereby said casing is divided into a forward portion and a rearward portion, said lamp being arranged in said rearward portion, said annular ring member and said partition forming a closure so that upon shattering of the lamp no splinters can enter the forward portion of the casing.

8. A device as claimed in claim 7, including means for adjusting said lamp on said tube, said means for adjusting said lamp being arranged before said annular ring member on said tube, and means for permitting access to said adjusting means when the tube is adjusted to its foremost position in which said partition is engaged by said annular ring member.

9. A device as claimed in claim 7, including means for adjusting said lamp transversely with respect to said tube, said lamp being arranged within a tubular member fixedly attached to said annular ring member said means for adjusting said lamp being composed of a second annular ring member fixedly attached to said tube and provided with radial slots, projections connected to said first ring member and extending into said radial slots, adjustment screws connected to said second ring member and serving for adjusting said projections within said radial slots, a door in said forward portion of said casing for permitting access to said adjusting screws, an electric switch in the circuit of said lamp, and means for opening said switch when said door is opened.

10. A device as claimed in claim 2, including a pin extending downwardly from said sleeve, and a horizontal plate having a cam slot therein fixedly attached to said vertical column, said pin extending into said cam slot which limits the adjustment of said tube in horizontal and lengthwise direction, the front end of said cam slot in said plate being formed by a pivotally mounted bar, a spring for normally holding said bar in a predetermined rest position, a normally open electric switch mounted in said casing and arranged in the circuit of said lamp, said pivotally mounted bar being adapted to be moved against the action of said spring by said pin on said sleeve upon axial adjustment of said tube to its foremost position, and means on said tube and cooperating with said casing for permitting a locking of said tube to said casing when the tube has been axially adjusted to its foremost position, said pin on said sleeve in said foremost position of said tube having moved said bar against the action of said spring so that said switch is closed.

11. A device as claimed in claim 2, including means for connecting said mirror to the front end of said tube to permit its adjustment about the longitudinal axis of this tube, a handle connected to said mirror in such a way that it can be adjusted about an axis which extends at right angles to the longitudinal axis of said tube, a grey filter slidably arranged in front of said center aperture of said mirror and means for automatically moving said grey filter in front of this center aperture during the coagulation process.

12. A device as claimed in claim 2, including means for connecting said mirror to the front end of said tube to permit its adjustment about the longitudinal axis of this tube, a handle connected to said mirror in such a way that it can be adjusted about an axis which extends at right angles to the longitudinal axis of said tube, a grey filter slidably arranged in front of said center aperture of said mirror, means included in said handle for automatically moving said grey filter in front of this center aperture during the coagulation process, a screen diaphragm arranged between said lamp and said condenser, and means for pivotally moving said screen diaphragm out of the path of light during the actual treatment of said eye.

13. A device as claimed in claim 2 including means for connecting said mirror to the front end of said tube to permit its adjustment about the longitudinal axis of this tube, a handle connected to said mirror in such a way that it can be adjusted about an axis which extends at right angles to the longitudinal axis of said tube, a grey filter slidably arranged in front of said center aperture of said mirror, means included in said handle for automatically moving said grey filter in front of this center aperture during the coagulation process, a screen diaphragm arranged between said lamp and said condenser, means for pivotally moving said screen diaphragm out of the path of light during the actual treatment of said eye, and a point-shaped diaphragm arranged in front of said lamp for preventing the light emanating from said lamp to fall upon said center aperture and a small circular area around this aperture.

References Cited in the file of this patent

UNITED STATES PATENTS

| 2,098,990 | Newton | Nov. 16, 1937 |
| 2,501,438 | Copeland | Mar. 21, 1950 |